March 6, 1956  H. SCHACHET  2,737,107

IMPELLER MECHANISM FOR POTATO CHIP MACHINES

Filed Dec. 6, 1952  2 Sheets-Sheet 1

INVENTOR.
HYMAN SCHACHET
BY
Martin E Anderson
ATTORNEY

March 6, 1956    H. SCHACHET    2,737,107
IMPELLER MECHANISM FOR POTATO CHIP MACHINES
Filed Dec. 6, 1952    2 Sheets-Sheet 2

INVENTOR.
HYMAN SCHACHET
BY
ATTORNEY

United States Patent Office 2,737,107
Patented Mar. 6, 1956

2,737,107

IMPELLER MECHANISM FOR POTATO CHIP MACHINES

Hyman Schachet, Denver, Colo.

Application December 6, 1952, Serial No. 324,560

3 Claims. (Cl. 99—405)

This invention relates to improvements in machines of the type employed in the production of "potato chips," "shoe string potatoes" and the like.

This invention, although it is useful for other purposes, will be described herein in connection with the production of that popular food product known as "potato chips."

Machines of the type to which this invention relates are well known and are extensively used. It has been found, however, that the usual machines of this type, although practical and extensively used, have some objectionable features which it is the object of this invention to overcome.

Machines of this type have long kettles which are kept partly filled with fat heated to a predetermined temperature which is kept constant by the use of thermostats that control gas burners, or other means of heating, such as electric heaters. The raw potato chips are deposited in the kettles near one end and are moved towards the other end by rakes that have a rotary movement which immerses the potato chips and carries them forwardly towards the discharge ends of the kettles where they are released and allowed to float on the fat toward the discharge elevators.

It is well understood that the flavor and the quality of the finished food product depends to a great extent on the temperature of the fat and the time the product is exposed to the action of the fat.

It is the object of this invention to produce a machine of the type referred to in which the rakes, instead of having a circular motion, shall be operated by means that will cause them to move downwardly into the fat by a quick motion and to a considerable depth thence forwardly at a slower rate and then upwardly to a point above the level of the fat.

It has been found that the long vertical or deep movement of the food product in the fat improves the flavor, simplifies and makes it easier to control the cooking of all deep fried foods, such as potato chips, because the rakes immerse the product quickly and deeply into the lower zone of the fat where its temperature is higher, retains the product at that level and temperature for a predetermined time and permits the cooked product to be quickly returned to the top of the fat. This method lessens the tendency to scorch and burn the product and the fat. Since the fat does not burn or smoke as much the product gets a better flavor.

Having thus called attention to the objects of the invention and in a general way described the principal feature thereof the invention will now be described in detail for which purpose reference will be had to the accompanying drawing in which the invention has been illustrated and in which.

Figure 1:
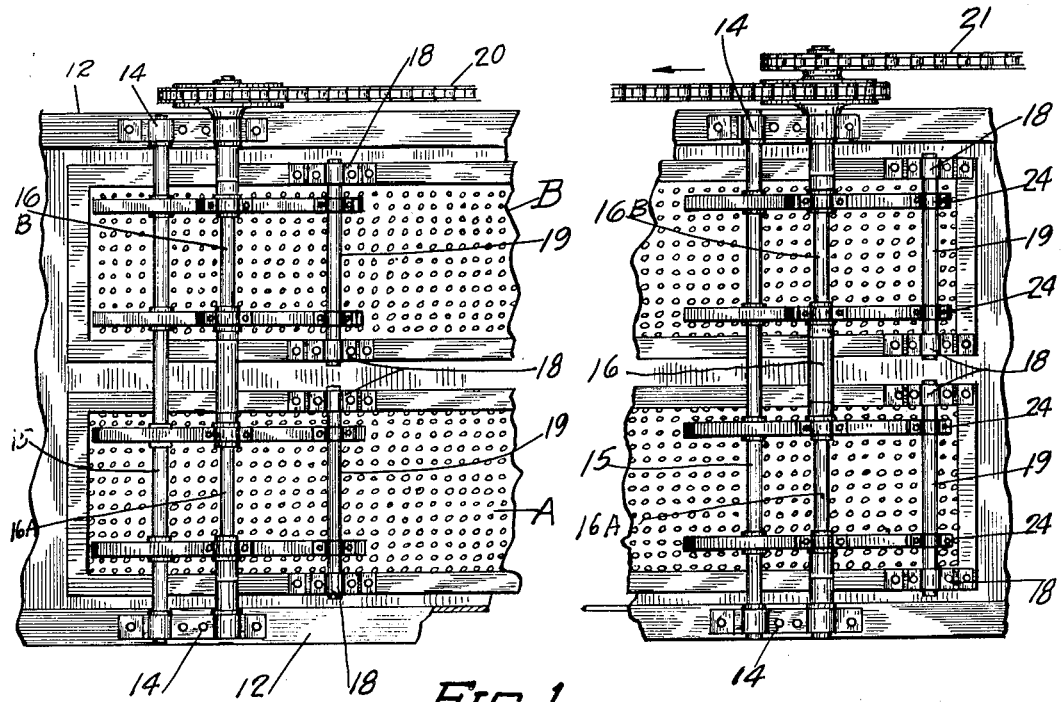
Figure 1 is a top plan view of a portion of the machine to which this invention relates.
Figure 2:
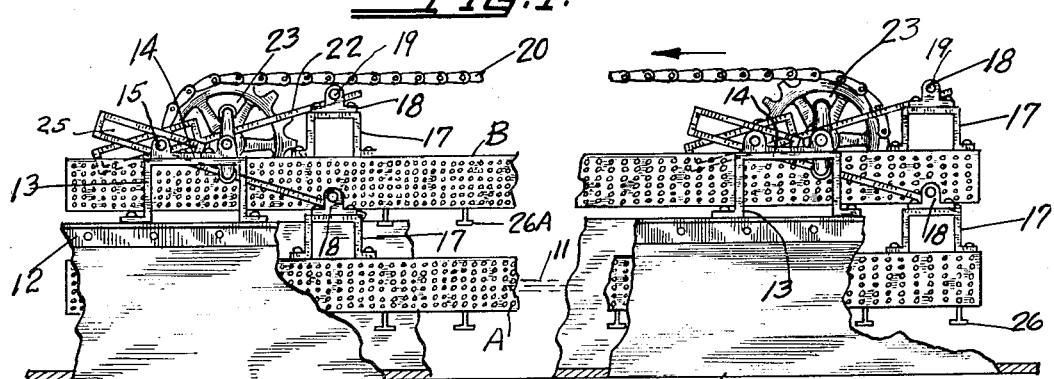
Figure 2 is a side elevational view, partly broken away, showing the relationship of the parts.

Referring now to the drawing reference numeral 10 designates an oblong rectangular kettle that contains the fat in which the potato chips are to be fried. In the machine illustrated the kettle has a length of over twelve feet, a width of forty inches and a depth of fourteen inches. It is understood, of course, that the size may be varied as desired. The kettle contains fat to the depth of approximately eight inches, the approximate level of the fat has been designated by line 11 in Figure 2. Positioned in the kettle are two rakes which are of identical size and construction and which have been designated by A and B. In the actual machine each rake is nine feet long, 18 inches wide and five inches deep, but may be made of any other desired size. The sides of the kettle are reinforced along its upper edge by outwardly extending angle iron bars 12 shown most clearly in Figure 3. Attached to the upper surface of the reinforcing bars are support brackets 13 to the tops of which bearing blocks 14 are attached by bolts or other means. The bearing blocks are arranged in pairs, bearing blocks of each pair being positioned directly across from each other. A round bar 15 connects the bearing blocks of each pair as shown most clearly in Figure 1. Journaled in bearings in the right hand ends of each pair is a crank shaft 16 which is shown most clearly in Figure 4. Each rake is provided on each side with two brackets 17 to the tops of which bearing blocks 18 are attached. Round bars of steel shafting 19 interconnect the bearing blocks 18. The crank shafts 16 are interconnected by motion transmitting means such as chains 20, or equivalent means such as gears, so as to rotate in unison at exactly the same speed. From Figure 3 it is seen that each crank shaft has two cranks 16A and 16B that are 180° apart. The two crank shafts are so interconnected that the respective cranks are always in the same angular positions. The crank shafts are rotated in a counterclockwise direction when viewed as in Figure 2, by power transmitted to one of the crank shaft by chain 21 or some mechanically equivalent means.

Figure 4:
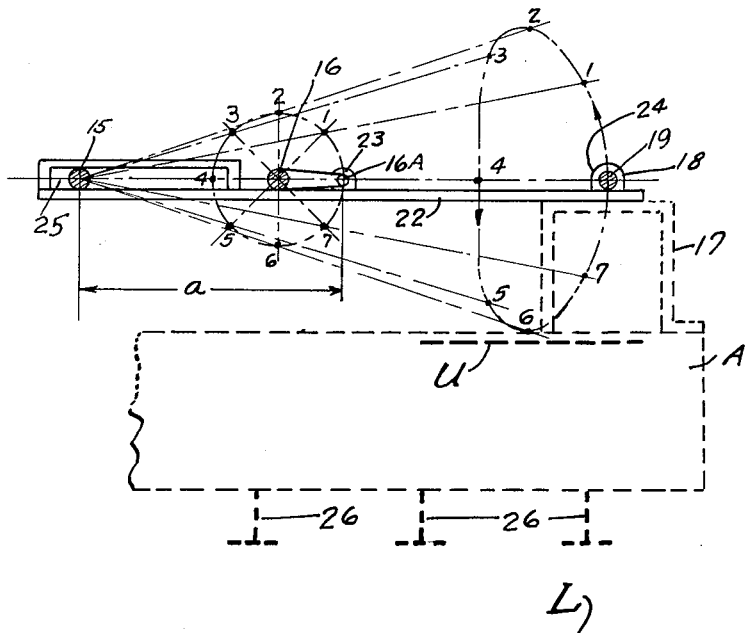
Figure 4 is a diagram showing the means employed for imparting the desired motion to the racks and also shows the path of the rakes in their movement.

Referring now more particularly to Figure 4 where the mechanism for imparting to the rakes the desired motion has been shown to a larger scale, it will be observed that a flat steel bar 22 extends from bar 15 to bar 19 and is pivotally connected with crank arm 16A by means of a bearing block 23. Bearing blocks 24 serve to connect one end of each bar 22 with a shaft 19. The other ends of bars 22 have elongated opening 25 through which bars 15 extend as shown in Figure 3.

Let us now assume that the parts are in the position shown in Figure 4 with bars 15 and 19 and crank shaft 16 in the same horizontal plane and that shaft 16 starts rotating slowly in a counterclockwise direction but at a uniform angular rate. The position of crank 16A at the end of each 45 degrees angular movement has been indicated and numbered 1 to 7 these being 8 positions shown. The locus of the axis of bar 19 has also been shown. Bar 22 becomes a lever having constantly varying relative lever arm lengths. The distance from the center of crank arm 16A to bar 19 remains a constant whereas the other arm namely the distance between 15 and 16A changes constantly as the crank shaft turns. It will become clear that when the parts have the relationship shown in Figure 4 lever arm A is at its maximum length and since distance 16A-19 is constant that rate at which 19 moves along its path is slowed on the up stroke. When crank pin 16A is at point 4 its distance from the fulcrum point 15 is a minimum and bar 19 moves downwardly at a much faster rate than it moved upwardly, the downward path is also nearly straight. From Figure 4 the variations in the movement of bar 19 is clearly apparent and will not be further described. Since rake A partakes of the same movement as bar 19 it follows that it moves at its fastest speed in going downwardly. During the time the food product is immersed it is moved forwardly to substantially twice the length of the crank arm while in the hottest stratum of the fat. There is a multiplication of the vertical movement of bar 19 over the vertical movement of crank 16A and in Figure 4 the lowermost position of the bottom of rake A has been designated by L and the uppermost position by U.

In the usual machines of this type the rakes are attached directly to a crank pin that rotates in a circle at a constant angular velocity. The food product moves through the hot fat at a uniform angular velocity.

Figure 3:
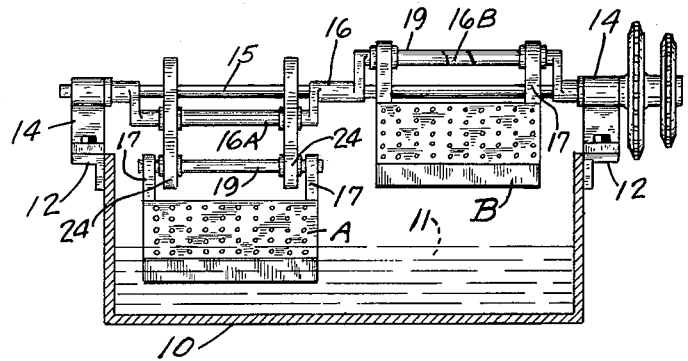
Figure 3 is a transverse section taken on line 3—3 Figure 1.

In Figure 3 rake A is shown in its lowermost position while rake B is shown in its uppermost position and this shows the long range of vertical movement. By raising the level of the fat the time the food product is submerged can be increased.

As a result of the deep movement, the pushers and bars agitate and mix the fat as well as the product more thoroughly than has been possible heretofore with the conventional machines currently being used, making a better and more flavorful product. This is because the deep movement method more thoroughly mixes the damp upper fat which is also colder with the lower fat which is hotter and drier, thus cooking the product in a fat zone that is neither too wet or too dry hot.

The upper edges of the rake walls must terminate at a point that will leave them slightly below the level of bars 15 when at the top of their movement.

The rakes have been shown as being made from foraminated sheet metal but may be made from screen woven from heavy wire.

Transverse bars 26 preferably I beams, are attached to the undersides of the rakes as shown. Other forms may be substituted if desired.

In the drawing two rakes have been shown but any number from one up can be used, as such additions amount to duplication only.

What is claimed as new is:

1. In a machine for frying sliced vegetables such as potatoes for the production of potato chips or the like, of the type having an elongated kettle for not fat, and means comprising at least one elongated rake having transverse bars projecting downwardly from its under surface; means for imparting to the rake a motion in a closed path in which the movement downwardly, forwardly, and upwardly takes place at different speeds the speed of the downward movement being faster than either of the other two and the upward speed being faster than the forward speed, said means comprising, a bar extending across the kettle and supported from the side walls thereof, a crank shaft mounted for rotation in bearings likewise supported by the sides of the kettle and spaced forwardly from the bar in the direction of material movement, and a lever having a bearing in operative engagement with the crank pin, the rear end extending across the bar, the front end being pivotally connected with the rake, means guiding the lever in its movement across the bar, and means for rotating the crank shaft in such a direction that the movement of the crank pin at its top is toward the bar whereby the front end of the lever and the rake will move in a closed path, and in which the downwards movement of said front end is faster than the forward or the upward movement and in which the forward movement of said front end is slower than either of the other two.

2. A device in accordance with claim 1 in which there are two mechanisms of the type defined are spaced along the rake, each having the front end of its lever connected with the rake near its ends whereby every point of the rake will be constrained to move in a closed path identical with the point of the lever to which it is attached.

3. A device in accordance with claim 2 in which there are two rakes arranged in parallel relation and in which each crank shaft has two cranks spaced angularly 180 degrees apart, means for rotating the crank shafts at identical speeds in the same direction whereby the rakes will move parallel to themselves and in opposite directions.

References Cited in the file of this patent

UNITED STATES PATENTS

| | | |
|---|---|---|
| 851,731 | Daley | Apr. 30, 1907 |
| 865,999 | Coombs | Sept. 17, 1907 |
| 1,086,248 | Varian | Feb. 3, 1914 |
| 1,531,256 | Morrow | Mar. 24, 1925 |
| 2,176,624 | Ferry | Oct. 17, 1939 |
| 2,207,316 | Ferry | July 9, 1940 |
| 2,552,441 | McBeth | May 8, 1951 |
| 2,611,705 | Hendel | Sept. 23, 1952 |